United States Patent [19]

Cooper et al.

[11] 4,057,599
[45] Nov. 8, 1977

[54] PROCESS FOR THE PREPARATION OF VINYL AROMATIC-MODIFIED POLYPHENYLENE ETHERS

[75] Inventors: Glenn Dale Cooper, Delmar; Irwin Schraga, Guilderland, both of N.Y.

[73] Assignee: General Electric Company, Pittsfield, Mass.

[21] Appl. No.: 733,519

[22] Filed: Oct. 18, 1976

[51] Int. Cl.$^2$ .................... C08L 23/00; C08L 25/00
[52] U.S. Cl. .................. 260/874; 260/47 ET; 260/876 R; 260/876 B; 260/892
[58] Field of Search ............. 260/47 ET, 874, 876 R, 260/876 B, 892

[56] References Cited

U.S. PATENT DOCUMENTS

| | | | |
|---|---|---|---|
| 3,306,874 | 2/1967 | Hay | 260/47 |
| 3,306,875 | 2/1967 | Hay | 260/47 |
| 3,356,761 | 12/1967 | Fox | 260/874 |
| 3,383,435 | 5/1968 | Cizek | 260/874 |
| 3,522,326 | 7/1970 | Bostick et al. | 260/823 |
| 3,883,613 | 5/1975 | Cooper | 260/874 |
| 3,887,647 | 6/1975 | Yonemitsu et al. | 260/876 B |
| 3,929,931 | 12/1975 | Izawa et al. | 260/874 |
| 3,954,904 | 5/1976 | Yonemitsu et al. | 260/873 |
| 3,956,423 | 5/1976 | Katchman | 260/874 |
| 3,960,985 | 6/1976 | Cooper | 260/874 |
| 3,969,320 | 7/1976 | Modan | 260/47 ET |
| 3,981,841 | 9/1976 | Abolins et al. | 260/874 X |
| 3,983,090 | 9/1976 | Abolins et al. | 260/874 X |

FOREIGN PATENT DOCUMENTS 1,264,889   2/1972   United Kingdom.

OTHER PUBLICATIONS

A. Factor et al., Journal of Polymer Science, 7B 205 (1969).

*Primary Examiner*—Murray Tillman
*Assistant Examiner*—T. De Benedictis, Sr.
*Attorney, Agent, or Firm*—William F. Mufatti; Granville M. Pine; Edward A. Hedman

[57] ABSTRACT

A complex of polyphenylene ether resin and methylene chloride obtained by polymerizing a phenol in methylene chloride and then cooling the mixture to cause the complex to precipitate, is mixed with a vinyl aromatic compound, e.g., styrene monomer, heated to decompose the complex and remove methylene chloride from the blend, and thereafter the vinyl aromatic compound is polymerized. The products are useful as molding resins and the like.

10 Claims, No Drawings

PROCESS FOR THE PREPARATION OF VINYL AROMATIC-MODIFIED POLYPHENYLENE ETHERS

This invention relates to an improved method to prepare resinous compositions and to the composition themselves. More particularly, it concerns the formation of compositions of polyphenylene ether resins and vinyl aromatic resins by decomposing a polyphenylene ether-methylene chloride complex (obtained as the reaction product of the oxidation of a suitable phenol in methylene chloride solution) in a vinyl aromatic compound and, after removal of the methylene chloride, polymerizing the vinyl aromatic compound.

BACKGROUND OF THE INVENTION

Polyphenylene ethers are known and described in numerous publications including Hay, U.S. Pat. Nos. 3,306,874 and 3,306,875. Polyphenylene ethers can be combined with vinyl aromatic resins, e.g., styrene resins, to provide thermoplastic compositions having many properties improved over those of either polyphenylene ether resin or styrene resin alone. See Cizek, U.S. Pat. No. 3,393,435. Polyphenylene ether-vinyl aromatic resin compositions can be made by forming a mixture of polyphenylene ether resin and the vinyl aromatic compound, see, for example, Fox, U.S. Pat. No. 3,356,761; Bostick and Hay, U.S. Pat. No. 3,522,326; and U.K. Pat. No. 1,264,889.

In a copending application (Attorney's Docket GE-429 (8CH-2122/2154)), filed concurrently herewith by applicants herein, is described an improved process to make a polyphenylene ether-methylene chloride solid complex. In the process, methylene chloride is used as a combined solvent for polymerization and as a precipitant for the polyphenylene ether product. Typically, 2,6-xylenol is oxidatively coupled to produce a resin at elevated temperature (<40° C.) under oxygen pressure, the polymerization catalyst is extracted from the hot solution with aqueous acid or a chelating agent, and then the mixture is cooled. The polymer precipitates as a complex with methylene chloride and is removed by filtration or centrifugation. In the application above-mentioned, the polymer complex is washed with methylene chloride to remove quinones and other low molecular weight reaction products, and sometimes with water to complete removal of the catalyst. The wet cake is then heated to break up the complex and drive off methylene chloride and water—producing dry, amorphous polyphenylene ether powder suitable for blending, e.g., with other ingredients, such as styrene resins, glass fiber fillers, flame retardant agents, stabilizers, pigments and other conventional molding resin components.

It has now been discovered, and is the subject matter of the present invention, that the drying step can be eliminated and compositions comprising polyphenylene ethers and vinyl aromatic resins can be prepared from the wet cake by suspending it in monomeric vinyl aromatic compounds and heating gently to break the complex and distill off methylene chloride (and water). After the methylene chloride (and water) has been removed, the temperature of the mixture may be increased to bring about polymerization of the vinyl aromatic compound. Of course, catalysts can be added, if desired, to increase the polymerization rate. When enough of the monomer has been polymerized to provide the desired composition ratio, the composition of two resins is isolated by crumbing in hot water, spray drying, devolatizing in an extruder, or other conventional procedures, and any excess of vinyl aromatic compound can be recovered for recycling.

In comparison with conventional coextrusion techniques, the compositions provided by the present process are made without costly blending and compounding equipment, and high extrusion temperatures—and the possibility of polymer degradation, color formation, and the like—are avoided.

The process of this invention can be used with the polymer-methylene chloride complex produced by washing the cake with methylene chloride to remove low molecular weight impurities. Altenatively, it can be used with the "crude" wet cake, i.e., the highly colored polyphenylene ether-methylene chloride complex prepared by washing the cake with water to remove catalyst—but not colored impurities. In the latter case, the final product is a light colored composition of polyphenylene ether and poly (vinyl aromatic), because of a considerable reduction in color which occurs during polymerization of the vinyl aromatic component.

DESCRIPTION OF THE INVENTION

This invention provides in a process for the preparation of a composition comprising a polyphenylene ether resin and a vinyl aromatic resin which comprises heating a mixture comprising a polyphenylene ether resin and a vinyl aromatic compound under polymerization conditions until the vinyl aromatic compound has at least partially polymerized, the improvement which comprises forming said mixture from (i) a polyphenylene ethermethylene chloride complex obtained by polymerizing a phenol in methylene chloride and then cooling to precipitate the complex and (ii) said vinyl aromatic compound, heating said mixture to decompose said complex and to remove the methylene chloride from the mixture, and thereafter continuing said heating until the vinyl aromatic compound has at least partially polymerized.

The products prepared by the process, as defined, are also contemplated by this invention.

The preferred polyphenylene ethers are of the formula:

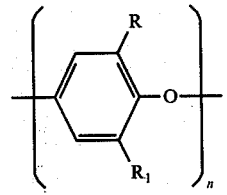

wherein the oxygen ether atom of one unit is connected to the benzene nucleus of the next adjoining unit; $n$ is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus. Especially preferred as the polyphenylene ether is poly(2,6-dimethyl-1,4-phenylene)ether.

The vinyl aromatic compound can be a sytrene or substituted styrene, a vinyl naphthalene or substituted vinyl naphthalene, or the like. The preferred vinyl aromatic compounds will fall within the formula:

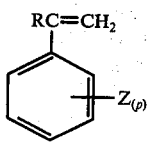

wherein R is hydrogen, lower alkyl or halogen, Z is hydrogen, lower alkyl, chloro or vinyl and $p$ is a whole integer of from 1 to 5. "(Lower) alkyl" means alkyl of from 1 to 6 carbon atoms. Typically, the vinyl aromatic compounds will be styrene, α-methyl styrene, vinyl toluene, and the like. Especially preferred is styrene.

Polymerization of the vinyl aromatic compound in admixture with the polyphenylene ether resin can be carried out by conventional techniques, such as suspension, bulk, bead, etc., techniques with and without agitation, with and without the addition of conventional modifiers, such as natural or synthetic resins or rubbers, etc., and using a catalyst, if desired. Preferably, polymerization will be by a bulk technique.

The ratio of polyphenylene ether resin to vinyl aromatic compound is not critical, and can vary between 1 to 60 parts of the former to 40 to 99 parts of the latter, by weight, preferably, 20 to 50 and 80 to 50, respectively.

The polyphenylene ether-complex forming reaction is carried out under a wide variety of well known process conditions. Merely be way of illustration, a copper halide can be mixed with an aliphatic amine in methylene chloride, then oxygen or an oxygen-containing gas is pressured into the closed system containing the appropriate phenol, e.g., 2,6-xylenol. The mixture is agitated at a temperature of at least about 40° C. The degree of polymerization is primarily controlled by the reaction time, although catalyst activity, promoters, temperature, oxygen pressure (or partial pressure) and other parameters have known effects.

At the point where the polymerization reaction reaches the desired degree of polymerization or molecular weight, the reaction solution will comprise polyphenylene ether, typically from 1 to 50% by weight and usually from 5 to 30% by weight, metal and amine (from the catalyst), typically from 0.005 to 1.5% of metal and from 0.5 to 2% of amine, by weight, as well as minor amounts of other materials, such as various promoters, byproducts, unreacted monomer, and the like. The catalyst components are extracted from the hot solution, if desired, by contacting with an aqueous solution of an acid, or of a chelating agent, such as a salt of ethylenediaminetetraacetic acid. Cooling down to about 25° C. or below then causes the precipitation of a polyphenylene ether-methylene chloride complex, which is used as the starting material herein.

In one manner of proceeding, the wet cake, recovered by filtration or separation, comprising polyphenylene ether-methylene chloride is suspended in vinyl aromatic compound and the mixture is heated gently, e.g., to 40° to 50° C., to break the complex and to distill off the methylene chloride (and water). The methylene chloride comes off readily, first, because of its low boiling point and will be admixed with water, if present. The distillate then will comprise water and vinyl aromatic compound, as the temperature is further increased. After the distillate becomes essentially vinyl aromatic compound, the temperature is further increased, e.g., to 85° C. and higher, closing the system, if necessary, and adding a catalyst, etc., if desired, to start the polymerization. Rubber or other modifiers may be added at this point if desired. When at least enough of the vinyl aromatic compound has polymerized to provide the desired ratio of polyphenylene ether resin to vinyl aromatic resin, heating is discontinued and the product is isolated in any desired manner, e.g., by crumbing in boiling water, by spray drying, by concentrating the passing through a devolatilizing extruder, and the like.

It can be seen that expensive drying equipment is avoided. It is advantageous that dry polyphenylene ether resin is obtained without exposing the resin to the high temperatures necessary to drive off water in a conventional dryer. Exposure of the polyphenylene ether to the high temperatures of conventional drying may cause degradation of the polymer, leading to an increase in color and some deterioration of physical properties. In essence, the total process provides a path from the two monomers to the blend of the two polymers without ever exposing the product to the high temperatures of drying or extrusion.

DESCRIPTION OF THE PREFERRED EMBODIMENTS

The following examples are for the purpose of illustration and are not to be construed as limiting the invention.

EXAMPLE 1

A solution of 1.23 grams of cupric bromide and 0.42 grams of methyltrioctylammonium chloride in 20 ml. of methanol is added to 32.7 grams of di-n-butyl amine in 100 ml. of methylene chloride. The catalyst solution is transferred to a one gallon stirred reactor with 1300 ml. of methylene chloride. Oxygen is introduced to a pressure of 30 psig and a solution of 210 grams of 2,6-xylenol in 246 ml. of methylene chloride is added through a pump over a period of 10 minutes, followed by 100 ml. of methylene chloride. The temperature of the reaction mixture is allowed to increase slowly to 44° C. and the pressure maintained at 30 psig. At 105 minutes after the beginning of reacting a solution of 5.5 grams of 38% aqueous trisodium salt of ethyelendiaminetetraacetic acid in 15 ml. of water is added and the mixture stirred for 10 minutes. The hot solution is drawn off and cooled for three hours in an ice bath. The precipitate is filtered off and washed throughly with water to remove cooper. A small sample, approximately one gram, is removed and dried in vacuum; the poly(2,6-dimethyl-1,4-phenylene)ether has an intrinsic viscosity of 0.54 dl.g. measured in chloroform at 30° C.

The crude wet cake of polymer-methylene chloride complex, intensely yellow in color, is added to 400 grams of styrene in a round bottom flask. A slow stream of nitrogen is introduced and the mixture is heated to drive off methylene chloride and water. After seven hours, the distillate no longer consists of two phases— and the temperature of the mixture in the pot is 85° C. Styrene, 160 grams, is added to the mixture and a portion of the solution is heated for 14 hours at 130° C. in a pressure bottle. The product contains 85% polymer, in the proportion of 62 parts of poly(2,6-dimethyl-1,4-phenylene)-ether to 38 parts of polystyrene, by weight. The composition is light ivory color, much lighter than a composition prepared by coextrusion of the two homopolymers. After devolatilization under a vacuum at 150° F., compression molding of the composition at 500° C. yields transparent, almost colorless films.

EXAMPLE 2

Example 1 is repeated, except that some of the volatiles are removed from the wet cake of polyphenylene ethermethylene chloride complex under vacuum at room temperature (23° C.) before heating with styrene. After four hours, the mixture is diluted with 100 grams of styrene and a portion of the mixture heated under nitrogen for 14 hours at 130° C. The product, a light amber colored solid, contains 72% polymer in the proportion of 41 parts of poly(2,6-dimethyl-1,4-phenylene)-ether to 59 parts of polystrene, by weight.

EXAMPLE 3

Cupric bromide, 2.46 grams, and 0.82 grams of methyltrioctylammonium chloride are dissolved in 30 ml. of methanol and added to 65.4 grams of dibutylamine in 200 ml. of methylene chloride. The catalyst is transferred to a one gallor reactor with 1100 ml. of methylene chloride. The reactor is filled with oxygen to a pressure of 30 psig and 420 grams of 2,6-xylenol in 446 ml. of methylene chloride is added over a period of 20 minutes. The temperature is held at 44° C. and the pressure at 30 psig. After 65 minutes, the polymerization is terminated by addition of a 38% aqueous solution of the trisodium salt of ethylenediaminetetraacetic acid and the mixture is cooled for three hours in an ice bath to cause precipitation of the polymer-methylene chloride complex. The complex is filtered off, washed on the filter with 2000 ml. of cold methylene chloride and then with water. The wet cake is transferred to a five liter flask equipped with a high speed stirrer, a reflux condenser, and a Dean-Stark trap. 1200 ml of styrene is added, a slow current of nitrogen is introduced and the mixture is heated. The first portion of the distillate consists of a lower phase of methylene chloride with a trace of styrene, and an upper phase of water. Both phases are withdrawn from the Dean-Stark trap. When the temperature of the mixture reaches approximately 70° C., the character of the distillate change, and the upper phase consists of styrene, with water as the lower phase. The water is drawn off as it accumulates in the trap. When the temperature reaches 90° C., distillation of water ceases and the temperature is increased rapidly to 100° C. Ethylbenzene, 400 ml., is added and the temperature is adjusted to 100° C. and the mixture held overnight at this temperature. The temperature is then increased to 120° C. for four hours. A sample of the mixture is withdrawn, diluted with toluene, and the polymer is precipitated with methanol. Analysis shows that it consists of 96% poly(2,6-dimethyl-1,4-phenylene)ether and only 4% polystyrene. The temperature is slowly increased to approximately 135° C., and held at 135° to 140° C. for one hour, then for four hours at 120° C. The mixture is diluted to approximately five liters with toluene and the polymer composition is isolated by spraying the solutions under nitrogen pressure into vigorously stirred hot water, kept hot with steam. The polymer composition, a light tan powder, is filtered off, washed with water, and dried under vacuum. Analysis shows that it consists of 57% poly(2,6-dimethyl-1,4-phenylene)ether and 43% polystyrene.

One hundred parts by weight of this product is mixed with 10 parts by weight of Kraton 1101, a sytrenebutadiene copolymer manufactured by the Shell Chemical Company, and five parts by weight of titanium dioxide and extruded at 450° F. in a twin screw extruder. The extruded pellets are injection molded into test pieces of very light color with 26% elongation, a tensile strength of 7400 psi., and notched Izod impact strength of 1.1 ft.lbs./in. of notch.

Other modifications and variations of the present invention are possible in the light of the above teachings. It is, therefore, to be understood that changes may be made in the particular embodiments described which are within the full intended scope of the invention as defined by the appended claims.

We claim:

1. In a process for the preparation of a composition comprising a polyphenylene ether resin and a vinyl aromatic resin which comprises heating a mixture comprising a polyphenylene ether resin and a vinyl aromatic compound under polymerization conditions until the vinyl aromatic compound has at least partially polymerized the improvement which comprises forming said mixture from (i) a polyphenylene ethermethylene chloride complex obtained by oxidinzing a phenol in a warm solution of methylene chloride in the presence of a complex catalyst, extracting the catalyst and cooling in precipitate the complex and (ii) said vinyl aromatic compound, heating said mixture to decompose said complex and to remove the methylene chloride from the mixture, and thereafter continuing said heating until the vinyl aromatic compound has at least partially polymerized.

2. A process as defined in claim 1 wherein said polymerization is carried out in bulk.

3. A process as defined in claim 1 wherein said mixture comprises 1.0 to 60 parts by weight of polyphenylene ether and from 40 to 99.0 parts by weight of vinyl aromatic compound.

4. A process as defined in claim 1 wherein said polyphenylene ether is of the formula:

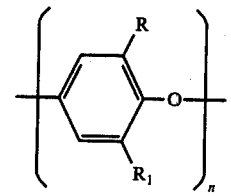

wherein the oxygen ether atom of one unit is connected to the benzene nucleus of the next adjoining unit; n is an integer of at least 50; and R and $R_1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

5. A process as defined in claim 4 wherein said polyphenylene ether is poly(2,6-dimethyl-1,4-phenylene)ether.

6. A process as defined in claim 1 wherein said vinyl aromatic compound is of the formula:

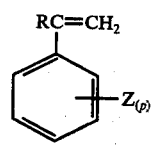

wherein R is hydrogen, lower alkyl or halogen, Z is hydrogen, lower alkyl, chloro or vinyl and p is a whole integer of from 1 to 5.

7. A process as defined in claim 6 wherein said vinyl aromatic compound is styrene.

8. A process as defined in claim 1 wherein said polyphenylene ether resin is poly(2,6-diemthyl-1,4-phenylene)ether and said vinyl aromatic compound is sytrene.

9. A composition comprising a polyphenylene ether and a vinyl aromatic resin which has been prepared by the process of claim 1.

10. A composition comprising poly(2,6-dimethyl-1,4-phenylene)ether resin and polystyrene resin which has been prepared by the process of claim 8.

* * * * *

UNITED STATES PATENT AND TRADEMARK OFFICE
CERTIFICATE OF CORRECTION

PATENT NO. : 4,057,599
DATED : November 8, 1977
INVENTOR(S) : Glenn Dale Cooper and Irwin Schraga It is certified that error appears in the above-identified patent and that said Letters Patent are hereby corrected as shown below:

In Col. 1, line 38, "($<40°C.$)" should read -- ($>40°C.$) --.

In Col. 2, line 2, "devolatizing" should read -- devolatilizing --; on line 14, "Altenatively" should read -- Alternatively --.

In Col. 3, line 31, "be" should read -- by --.

In Col. 4, lines 49-50, "cooper" should read -- copper --.

In Col. 5, lines 66-67, "sytrenebutadiene" should read -- styrene-butadiene --.

In Col. 6, line 20, after "ether" and before "methylene", insert a hyphen (-); on line 21, "oxidinzing" should read -- oxidizing --; on line 23, "in" should read -- to --.

In Col. 7, line 9, "poly(2,6-diemthyl-1,4-" should read -- poly(2,6-dimethyl-1,4- --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks